United States Patent Office 3,424,741
Patented Jan. 28, 1969

---

3,424,741
THIAZOLYL MONOAZO DYES FOR HYDRO-
PHOBIC FIBERS
David J. Wallace, James M. Straley and Max A. Weaver,
Kingsport, Tenn., assignors to Eastman Kodak Company, Rochester, N.Y., a corporation of New Jersey
No Drawing. Filed Nov. 26, 1965, Ser. No. 510,092
U.S. Cl. 260—158    8 Claims
Int. Cl. C07d 27/08; C09b 29/00

ABSTRACT OF THE DISCLOSURE

Thiazolyl-azo-aniline compounds are useful as dyes for hydrophobic textile materials and are characterized by a heterocyclic group attached to the coupler moiety and having the formula

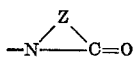

wherein Z reprseents the carbon atoms completing a pyrrolidinono radical, a piperidino radical, or a phthalimidino radical.

---

This invention relates to azo compounds particularly useful as dyes for textile fibers.

The azo compounds have the following general formula

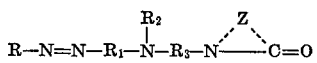

wherein R represents a monocyclic 2-thiazolyl radical, that is, a radical having the general formula

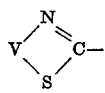

in which V is a vinylene group, including unsubstituted vinylene and mono- and di-substituted vinylene groups, such as

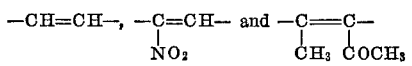

as present in 2-aminothiazole and the substituted 2-amino-thiazoles described in the examples and table below. The lower alkyl, trihaloalkyl, lower alkylsulfonyl, nitro, cyano, thiocyano and phenyl substituted 2-aminothiazoles are particularly useful in the preparation of the azo compounds;

$R_1$ represents a monocyclic carbocyclic aromatic group of the benzene series derived from an aminoalkylaniline coupling component and including p-phenylene and p-phenylene substituted with lower alkyl, e.g. o,m-methyl-p-phenylene; lower alkoxy, e.g. o,m-methoxy-p-phenylene; halogen, o,m-chloro-p-phenylene; lower alkylsulfonamido, e.g. o,m - methylsulfonamido-p-phenylene; lower alkanoylamino, e.g. o,m-acetamido-p-phenylene; lower alkylthio, e.g. o,m-methylthio-p-phenylene; and benzamido, e.g. benzamido p-phenylene;

$R_2$ represents hydrogen or an alkyl radical including unsubstituted alkyl, preferably lower alkyl, i.e. from 1 to 4 carbon atoms, and substituted alkyl such as hydroxy-alkyl, e.g. hydroxyethyl; polyhydroxyalkyl, e.g. 2,3-dihydroxypropyl; lower alkoxyalkyl, e.g. methoxyethyl; cyano-alkyl, e.g. cyanoethyl; lower cyanoalkoxyalkyl, e.g. β-cyanoethoxyethyl; lower alkanoyl-oxyalkyl, e.g. acetoxyethyl; lower carbalkoxyalkyl, e.g. carbethoxyethyl; halogenoalkyl, e.g. chloroethyl; hydroxyhalogenoalkyl, e.g. β - hydroxy-γ-chloropropyl; lower alkylsulfonylalkyl, e.g. methylsulfonylethyl; lower alkyl-$OCOOCH_2CH_2$—, e.g. $CH_3OCOOCH_2CH_2$; carbamoylalkyl, e.g. carbamoylethyl; lower alkylcarbamoylalkyl, e.g. ethylcarbamoylethyl; phenoxyalkyl, e.g. β-phenoxyethyl; lower alkylsulfonamidoalkyl, e.g. methylsulfonamidoethyl; dicarboxamidoalkyl, e.g. β-dicarboxamidoethyl, etc. or $R_2$ represents benzyl, cycloalkyl or a monocyclic carbocyclic aromatic radical of the benzene series, e.g. lower alkylphenyl, lower alkoxyphenyl, halophenyl, etc. A preferred group represented by $R_2$ includes hydrogen, alkyl, alkoxyalkyl, phenoxyalkyl, alkanoyl-oxyalkyl, haloalkyl, hydroxyalkyl, carbethoxyalkyl or cyanoalkyl, the alkyl groups of which are lower alkyl.

$R_3$ represents lower alkylene or substituted alkylene, e.g. hydroxyalkylene, acyloxyalkylene, chloroalkylene, or cyanoalkylene and Z represents a chain of carbon atoms such as propylene, isopropylene, butylene,

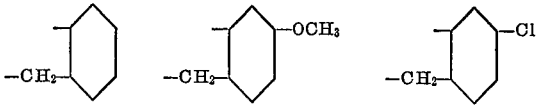

which together with

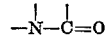

are necessary to complete a pyrrolidinono group, a methylpyrrolidinono group, a piperidino group, a phthalimidino group, a methoxyphthalimidino group or a chlorophthalimidino group in which the atoms represented by Z are a part of a fused-on benzene radical.

The azo compounds are obtained by diazotization in known manner of 2-aminothiazoles and derivatives thereof, with coupling components having the formula

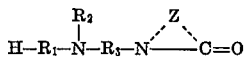

wherein $R_1$, $R_2$, $R_3$ and Z have the meaning given above.

The above coupling component in which the ring

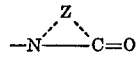

is monocyclic can be prepared by reacting aniline or an aniline derivative with butyrolactones or caprolactones as described in our U.S. patent application Ser. No. 390,212, now U.S. Patent 3,342,799. The above coupling components in which the ring is bicyclic can be prepared by reacting an N-aminoalkylaniline with phthalide or substituted phthalides such as chlorophthalide or an alkoxyphthalide, as described in our above U.S. application.

The azo compounds can be expected to possess properties distinct from similar azo compounds in which the ring

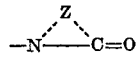

is connected directly to the benzene nucleus of a coupler in that they have better affinity and light fastness for polyesters.

Herein, alkyl, alkylene, lower alkyl and lower alkylene mean the alkyl chain, straight or branch-chained, contains 1 to 4 carbon atoms.

The azo compounds can be used for dyeing textile materials including synthetic polymer fibers, yarns and fabrics giving a variety of fast shades including red, blue and violet shades when applied by conventional dyeing methods. The azo compounds are useful, for example, for dyeing polyester, polyamide and cellulose acetate fibers and when used for dyeing such hydrophobic fibers should be free of water-solubilizing groups such as carboxyl and sulfo. In general, the azo compounds have good fastness, for example, to light, washing, gas (atmospheric fumes) and sublimation. The azo compounds can also be expected to respond favorably to other textile dye tests such as described in the A.A.T.C.C. Technical Manual, 1964 edition, depending in part upon the particular dye used and fiber being dyed.

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 gram of dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The following examples will serve to illustrate our invention.

Example 1

(A) Preparation of the coupler.—89.0 g. N-δ-aminoethyl-N-ethyl-m-toluidine and 47.3 g. of butyrolactone were refluxed together for 10 hours with water removed. The mixture was distilled in vacuo. The pure product distilled at 150–152° C./.1 mm. and had the structure:

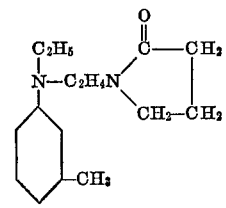

(B) Diazotization.—2.9 g. (0.02 m.) 2-amino-5-nitrothiazole was stirred in 60 cc. water and 32 cc. concentrated $H_2SO_4$ was added. Immediate solution resulted. The solution was cooled to —10° C. and a solution of 1.4 g. $NaNO_2$ in 16 cc. concentrated $H_2SO_4$ was added at —5° C. Stirring at —5° C. was continued for 10 minutes.

(C) Coupling.—4.92 g. (0.02 m.) N-[2-(N'-ethyl-m-toluidino)ethyl]-pyyrolidinone from (A) was dissolved in 100 ml. 15% aqueous sulfuric acid. The coupling solution was cooled in an ice bath and the diazonium solution from (A) above was added, with stirring. After coupling 10 minutes, the mixture was drowned with water, filtered, washed with water and dried. The product dyed cellulose acetate and polyester fibers a fast brilliant blue shade. It has the following structure:

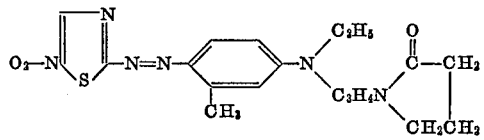

Example 1a

A dye was made according to Example 1 using 4.56 g. N-[2-(N'-ethylanilino)ethyl]-pyrrolidinone. The product dyes cellulose acetate and polyester fibers a fast deep blue shade.

Example 1b

A dye was made according to Example 1 using 2.04 g. 2-aminothiazole. The product dyes cellulose acetate and polyester fibers a fast bright red shade.

Example 1c

A dye was made according to the cited Example 1 using 2.3 g. 2-amino-4 methylthiazole. The product dyes cellulose acetate and polyester fibers a fast deep red shade.

Example 1d

A dye was made according to Example 1 using 3.56 g. 2-amino-5-methylsulfonylthiazole. The product dyes cellulose acetate and polyester fibers a fast violet shade.

Azo compounds described in the table below having the following formula are prepared in the manner of Example 1 by coupling the indicated aminothiazole with the indicated pyrrolidinone coupler. The color is that obtained on polyester fibers. The dyeing properties of the compounds of the table are comparable to those of the above examples.

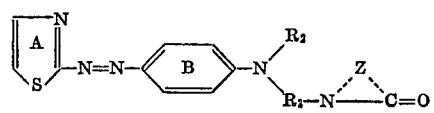

TABLE

| Example No. | Substituents Ring A | Substituents Ring B | R₂ | R₃ | Z | Color |
|---|---|---|---|---|---|---|
| 2 | 5-NO₂ | None | —C₂H₅ | —CH₂CH₂— | —CH₂CH₂CH₂—CH₃ | Violet. |
| 3 | 5-NO₂ | 3-OCH₃ | —C₂H₄CN | —CH₂CH₂CH₂— | —CHCH₂CH₂—CH₃ | Do. |
| 4 | 5-NO₂ | 3-OCH₃ | —C₂H₄OH | —CH₂CH₂CH₂— | —CHCH₂CH₂—CH₃ | Blue. |
| 5 | 5-NO₂ | 3-Cl | —C₂H₄Cl | —CH₂CHCH₂—CH₃ | —CH₂— 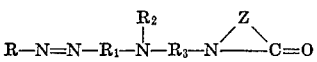 | Violet. |
| 6 | 5-NO₂ | 3-Cl | —C₂H₄OCH₃ | —CH₂CHCH₂—OH | —CH₂— (C₆H₄-Cl) | Blue. |
| 7 | 5-NO₂ | 3-NHCOCH₃ | —C₂H₄OCOCH₃ | —CH₂CH—CH₂—Cl | —CH₂— (C₆H₄-OCH₃) | Do. |
| 8 | 5-NO₂ | 3-NHCOCH₃ | —C₂H₄CO₂C₂H₅ | —CH₂CHCH₂—CN, OCOCH₃ | —CH₂CH₂CH₂CH₂— | Do. |
| 9 | 5-NO₂ | 3-OCH₃-6-CH₃ | —C₂H₄Br | —CH₂CH—CH₂ | —CH₂CH₂CH₂CH₂— | Do. |
| 10 | 5-NO₂ | 2,5-di-OCH₃ | —C₂H₄SO₂CH₃ | —CH₂CH₂ | —CH₂CH₂CH₂— | Do. |
| 11 | 5-NO₂ | 2,5-di-OCH₃ | —C₂H₄CONH₂ | —CH₂CH₂ | —CH₂CH₂CH₂— | Do. |
| 12 | 5-NO₂ | 2-CH₃ | H | —CH₂CH₂ | —CH₂CH₂CH₂— | Violet. |
| 13 | 5-NO₂ | 2-OCH₃ | H | —CH₂CH₂ | —CH₂CH₂CH₂— | Blue. |
| 14 | 5-NO₂ | 3-CH₃ | —CH₂CHCH₂Cl OH | —CH₂CH₂ | —CH₂CH₂CH₂— | Do. |
| 15 | 4-CF₃ | 3-CH₃ | —CH₂CHCH₂Cl OH | —CH₂CH₂ | —CH₂CH₂CH₂— | Red. |
| 16 | 4-CF₃ | 3-CH₃ | C₂H₅ | —CH₂CH₂— | —CH₂CH₂CH₂— | Red. |
| 17 | 4-CH₃ | 3-CH₃ | —C₂H₄CN | —CH₂CH₂— | —CH₂CH₂CH₂— | Red. |
| 18 | 4-CH₃ | 3-CH₃ | —C₂H₅ | —CH₂CH₂— | —CH₂CH₂CH₂— | Red. |
| 19 | 4-CO₂C₂H₅ | 3-CH₃ | —C₂H₅ | —CH₂CH₂— | —CH₂CH₂CH₂— |  |
| 20 | 4-CO₂C₂H₅ | 3-CH₃ | —C₂H₄CN | —CH₂CH₂— | —CH₂CH₂CH₂— | Red. |
| 21 | 4-NHCOCH₃ | 3-CH₃ | —C₂H₅ | —CH₂CH₂— | —CH₂CH₂CH₂— | Red. |
| 22 | 4-C₆H₅ | 3-CH₃ | —C₂H₅ | —CH₂CH₂— | —CH₂CH₂CH₂— | Red. |
| 23 | 5-Br | 3-CH₃ | —C₂H₅ | —CH₂CH₂— | —CH₂CH₂CH₂— | Red. |
| 24 | 5-SO₂C₄H₉ | 3-CH₃ | —C₂H₅ | —CH₂CH₂— | —CH₂CH₂CH₂— | Pink. |
| 25 | 5-SO₂CH₃ | 3-CH₃ | —C₂H₅ | —CH₂CH₂— | —CH₂CH₂CH₂— | Do. |
| 26 | 4-CH₃, 5-COCH₃ | 3-CH₃ | —C₂H₅ | —CH₂CH₂— | —CH₂CH₂CH₂— | Do. |
| 27 | None | 3-CH₃ | —C₂H₅ | —CH₂CH₂— | —CH₂CH₂CH₂— | Do. |
| 28 | do | 3-CH₃ | —C₂H₄CN | —CH₂CH₂— | —CH₂CH₂CH₂— | Red. |
| 29 | 5-CN | 3-CH₃ | —C₂H₅ | —CH₂CH₂— | —CH₂CH₂CH₂— | Violet. |
| 30 | 5-CN | 3-CH₃ | —C₂H₄CN | —CH₂CH₂— | —CH₂CH₂CH₂— | Do. |

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A water-insoluble compound having the formula

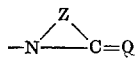

wherein
R is a monocyclic 2-thiazolyl radical;
$R_1$ is p-phenylene or p-phenylene substituted with lower alkyl, lower alkoxy, halogen, lower alkanoylamido, benzamido, lower alkyl-sulfonamido or lower alkylthio;
$R_2$ is hydrogen; lower alkyl; lower alkyl substituted with hydroxy, lower alkoxy, cyano, lower cyanoalkoxy, lower alkanoyloxy, lower carbalkoxy, halogen, lower alkylsulfonyl, carbamoyl, lower alkylcarbamoyl, phenoxy, or lower alkylsulfonamido; lower alkyl-OCOOCH₂CH₂—; benzyl; phenyl; or phenyl substituted with lower alkyl, lower alkoxy, or halogen;
$R_3$ is lower alkylene, 2-hydroxypropylene, 2-chloropropylene, 2-cyanopropylene, or 2-acetoxypropylene; and

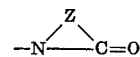

is pyrrolidinono, methylpyrrolidinono, piperidono, phthalimidino, methoxyphthalimidino, or chlorophthalimidino.

2. An azo compound of claim 1 wherein
$R_2$ is lower alkyl or lower alkyl substituted with lower alkoxyl, phenoxy, lower alkanoyloxy, halogen, hydroxy, carbethoxy or cyano; and $$-N\overset{Z}{\diagdown}C=O$$

is pyrrolidinono or methylpyrrolidinono.

3. A water-insoluble azo compound having the formula

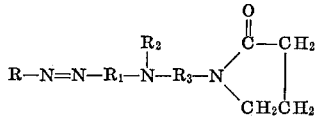

wherein
R is 2-thiazolyl substituted with lower alkyl, trifluoromethyl, lower alkylsulfonyl, nitro, cyano, thiocyano, or phenyl;
$R_1$ is p-phenylene or p-phenylene substituted with lower alkyl, lower alkoxy, halogen, or lower alkanoylamido;
$R_2$ is lower alkyl; and
$R_3$ is lower alkylene.

4. The compound defined in claim 1 having the formula:

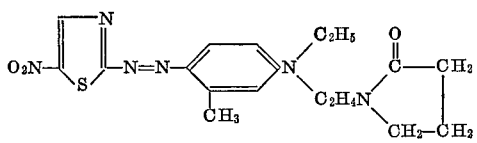

5. The compound defined in claim 1 having the formula:

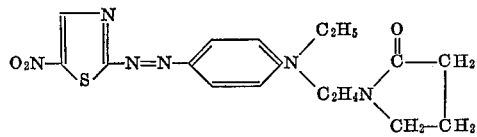

6. The compound defined in claim 1 having the formula:

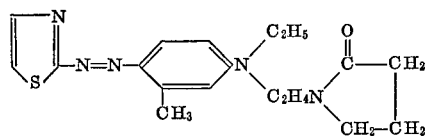

7. The compound defined in claim 1 having the formula:

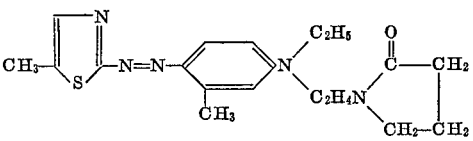

8. The compound defined in claim 1 having a formula:

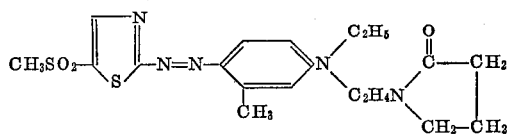

References Cited

UNITED STATES PATENTS 3,097,198   7/1963   Fishwick et al. _____ 260—158
3,337,522   8/1967   Wegmuller _____ 260—158
3,346,552   10/1967   Straley et al. _____ 260—158

CHARLES B. PARKER, *Primary Examiner.*

DONALD M. PAPUGA, *Assistant Examiner.*

U.S. Cl. X.R.

8—41, 55; 260—37, 293, 294.7, 302, 325, 326.5